I. S. FREEMAN.
GEARING.
APPLICATION FILED MAY 9, 1910.
994,073.
Patented May 30, 1911.
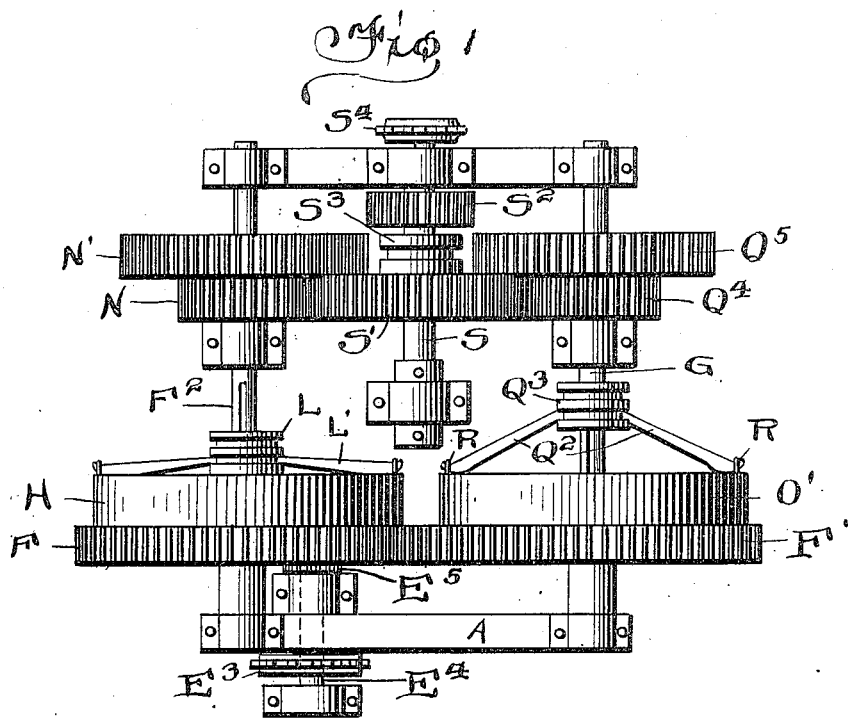
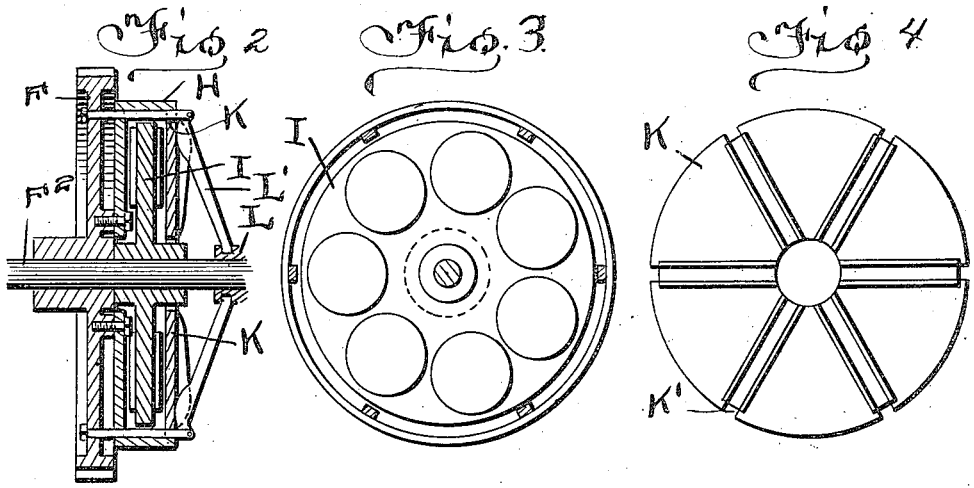
Witnesses
Geo. L. Thom
A. L. Hough
Inventor
I. S. Freeman.
By Franklin H. Hough
Attorney
THE NORRIS PETERS CO., WASHINGTON, D. C.

UNITED STATES PATENT OFFICE.

ISAAC S. FREEMAN, OF CENTURIA, WISCONSIN.

GEARING.

994,073.

Specification of Letters Patent.

Patented May 30, 1911.

Application filed May 9, 1910. Serial No. 560,218.

*To all whom it may concern:*

Be it known that I, ISAAC S. FREEMAN, a citizen of the United States, residing at Centuria, in the county of Polk and State of Wisconsin, have invented certain new and useful Improvements in Gearing; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.
This invention relates to new and useful improvements in friction clutch apparatus for reversing motion and adapted for use upon traction engines or wagons and comprises various details of construction and combinations and arrangements of parts which will be hereinafter fully described and then specifically defined in the appended claim.

I illustrate my invention in the accompanying drawings, in which:—

Figure 1 is a top plan view of the friction clutch reversing apparatus. Fig. 2 is a detail transverse sectional view through a part of the apparatus shown in Fig. 1. Fig. 3 is a side elevation of a friction disk, and Fig. 4 is an elevation of a detail of the apparatus.

Reference now being had to the details of the drawings by letter, A designates a frame of the apparatus in which the shafts G and $F^2$ are journaled, upon the latter of which a wheel F is loosely journaled while a gear wheel F' is loosely journaled upon the shaft G. A pinion $E^5$ is journaled upon a stub shaft $E^4$ which has a bearing in said frame and which pinion is in mesh with the gear wheel F which in turn meshes with the gear wheel F', causing the two wheels F and F' to rotate continuously in opposite directions.

Fixed to the gear wheel F is a housing or casing H centrally apertured for the reception of the hub of the friction wheel I which is keyed to the shaft $F^2$. A movable disk K is mounted about the hub of the friction wheel I and is provided with series of notches K' about its circumference, each of which is adapted to receive a bolt projecting from the wall of the casing and serving to guide the disk K as it is moved back and forth.
A clutch member, designated by letter L, has a series of radial arms L' projecting therefrom, each adapted to bear against the outer face of the disk or wheel K for the purpose of causing the latter to be thrown frictionally against the projections I' on the disk when it is desired to cause the gear wheel F and said disk I to move together. The friction clutch is operated by a lever in the usual manner in clutch throwing apparatus.

The shaft $F^2$ has the gear wheels N and N' of different diameters fixed to rotate therewith or, if preferred, said gear wheels N and N' may be integral and made to rotate with the shaft $F^2$.

The gear wheel F' is mounted loosely upon a shaft G and has a casing O' fixed thereto and a friction disk not shown but similar to the disk I above described is fixed to the shaft G and the radial arms $Q^2$ connected to the bolts R serve to actuate the friction disk I within the casing O' as the clutch $Q^3$ is operated to rotate the wheel F'.

Interposed between the two shafts G and $F^2$ is a stub shaft S having gear wheels S' and $S^2$ fixed thereto and of different diameters and a clutch collar $S^3$ is interposed between the two wheels S' and $S^2$ and forming means for shifting the two wheels S' and $S^2$ upon the shaft S to which they are splined. The gear wheel S', when the parts are in the position shown in Fig. 3 of the drawings, is in mesh with the two gear wheels N and $Q^4$. A sprocket wheel $S^4$ is fixed to the shaft S and forms means whereby power may be transmitted therefrom to any mechanism to be driven. A sprocket wheel $E^3$ is fixed to the shaft $E^4$ and to which power may be applied to drive the shaft $E^4$ and through the mechanism described to operate the apparatus.

In operation the apparatus may be driven by connection with a sprocket wheel $E^3$ and when it is desired to drive the apparatus in one direction, the clutch collar is actuated to throw the friction disk K against the friction blocks upon the disk I, causing the latter to rotate with the shaft and, through the gear connections shown, cause the gear wheel S' to rotate in one direction. If it is desired to impart accelerated speed to the apparatus, the clutch collar $S^3$ may be operated to throw the gear wheel $S^2$ in mesh with the gear wheel N' and, in the event of it being desired to reverse the motion of the apparatus, the clutch collar $Q^3$ may be operated to actuate friction means not shown and mounted within the casing O', thereby imparting a reverse movement to the gear wheels $Q^4$ and $Q^5$, which will operate the driving wheels in the opposite direction. By the manipulation of the hand wheel $D^4$, the gear wheel $D^2$ actuated thereby may cause the gear segment $D'$ to be moved in one direction or the other for the purpose of guiding the traction power apparatus by causing the latter to tilt in one direction or the other.

What I claim to be new is:—

A friction driving apparatus for wheels comprising a frame, shafts mounted therein and parallel to each other, a gear wheel having lugs projecting therefrom and loosely journaled upon each of said shafts and intermeshing with each other, a circular outlined casing having registering openings in the opposite sides thereof, screws passing through one wall of the disk and engaging apertures in said lugs, a friction wheel upon said shaft, a sliding collar upon the shaft, radial arms having their inner ends engaging the grooves of said collar, the outer face of said casing having radial grooves with flanges along the marginal edges thereof and designed to guide said radial arms, pins projecting from the gear wheel and through apertures in the casing, intermeshing gears mounted upon the shafts an intermediate shaft and movable gears mounted upon the latter, adapted to mesh with said intermeshing gears.

In testimony whereof I hereunto affix my signature in the presence of two witnesses.

ISAAC S. FREEMAN.

Witnesses:
E. Y. ARNOLD,
L. C. PERKINS.

---

Copies of this patent may be obtained for five cents each, by addressing the "Commissioner of Patents, Washington, D. C."